July 5, 1966  D. S. CHISHOLM  3,259,004

BAND SAW EMPLOYING A COPPER BLADE

Filed June 10, 1964

INVENTOR.
Douglas S. Chisholm
BY
ATTORNEY

United States Patent Office 3,259,004
Patented July 5, 1966

3,259,004
BAND SAW EMPLOYING A COPPER BLADE
Douglas S. Chisholm, Midland, Mich., assignor to The Dow Chemical Company, Midland, Mich., a corporation of Delaware
Filed June 10, 1964, Ser. No. 373,945
5 Claims. (Cl. 83—171)

This invention relates to an improved saw. It more particularly relates to an improved band saw and a method of cutting thermoplastic resinous materials.

Thermoplastic resinous materials in general are somewhat difficult to saw by conventional high speed cutting means due to the relatively low temperature at which the materials become fluid. Usually sawing of these materials, and particularly with a band saw or band blade, is accomplished by using a relatively slow blade speed and a relatively low feed rate if auxiliary coolant is not employed. Usually, in order to achieve high cutting rates without an auxiliary coolant it is necessary to use a blade having a relatively large amount of set and often of a skip tooth configuration. The resultant cut is usually rough and unattractive in appearance.

It is an object of this invention to provide an improved method for sawing thermoplastic resinous materials.

A further object of this invention is to provide an improved saw blade for cutting thermoplastic resinous materials.

Another object of the invention is to provide a band saw for cutting thermoplastic resinous materials.

These benefits and other advantages in accordance with the method of the present invention are achieved by cutting a thermoplastic resinous material by employing a metal cutting blade having a smooth cutting edge and made of a metal having a thermal conductivity greater than about 0.33 calorie per second per centimeter per square centimeter per degree centigrade, whereby the blade edge is forced against the thermoplastic material to be cut at a linear velocity sufficiently high to remove thermoplastic material from the work piece.

Also contemplated within the scope of the invention is a saw blade particularly suited for the cutting of thermoplastic resinous material comprising a flexible endless band of generally constant cross section adapted to be mounted on a band saw having smooth edges of equal length and consisting essentially of a metal having a thermal conductivity greater than about 0.33 calorie per second per centimeter per square centimeter per degree centigrade, whereby the blade edge is forced against the thermoplastic material to be cut at a linear velocity sufficiently high to remove thermoplastic material from the work piece.

Also contemplated within the scope of the present invention is a band saw comprising at least a first band wheel, a second band wheel, at least one of the band wheels being in cooperative combination with a drive means, a band blade supported and adapted to be driven by the peripheral portion of the band wheel, the band blade comprising an endless metal band having an elongated cross sectional configuration and smooth linear cutting edges, an induction heater positioned adjacent to and in operative combination with the blade and adapted to heat the blade immediately prior to entering a work piece.

These benefits and other features and advantages of the present invention will become more apparent when the following specification is taken in connection with the drawing wherein.

Figure 1:
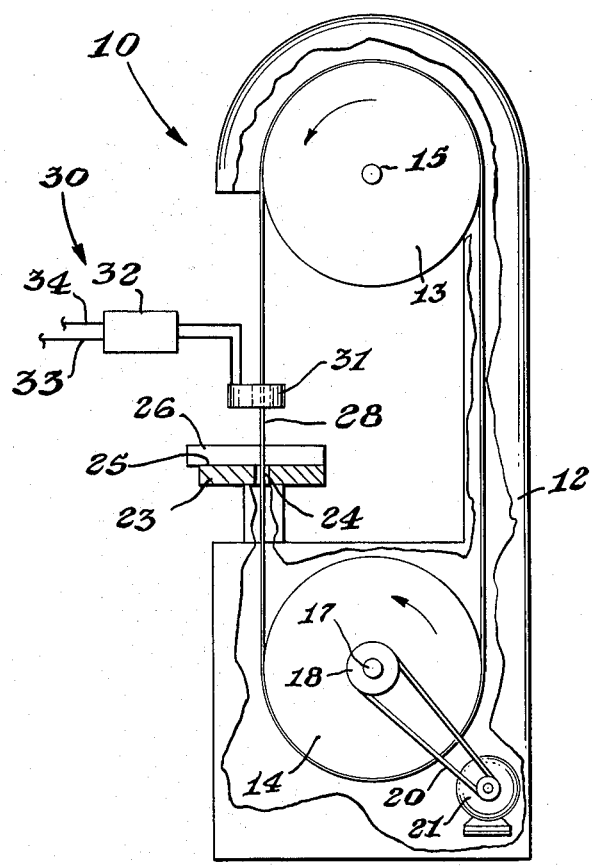
FIGURE 1 is a schematic illustration of the band saw in accordance with the invention.

In FIGURE 1 there is schematically illustrated a partly-in-section view of a band saw generally designated by the reference numeral 10. The band saw 10 comprises a frame 12 having mounted thereon an idling band wheel 13 and a driven band wheel 14. The idler 13 is rotatably mounted on a pivot 15. The band wheel 14 is rotatably mounted on a pivot 17 and affixed rigidly thereto is a pulley 18. A drive means or belt 20 operatively engages the pulley 18. The belt 20 is driven by a motor 21. A work support or table 23 is supported by the frame 12. Within the table 23 is defined an aperture 24 adapted to pass a blade. A work piece 26 is positioned on the surface 25 of the table 23. A band blade 28 is prepared from a metal having a thermal conductivity greater than about 0.33 calorie per second per centimeter per square centimeter per degree centigrade, whereby the blade edge is forced against the thermoplastic material to be cut at a linear velocity sufficiently high to remove thermoplastic material from the work piece. An induction heater generally designated by the reference numeral 30 is positioned adjacent the blade 28 immediately before the blade enters the work piece 26. The induction heater comprises low voltage induction coils 31 and a power source 32. The power source 32 is supplied from a suitable electric power source by the lines 33 and 34.

Figure 2:
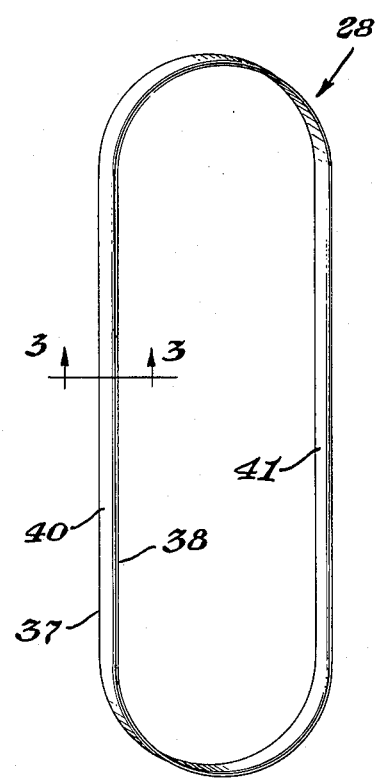
FIGURE 2 is an isometric view of the band blade of the present invention.

FIGURE 2 is an isometric representation of the band blade 28 illustrating smooth tapered rounded cutting edges 37 and 38. The blade 28 has parallel sides 40 and 41.

Figure 3:
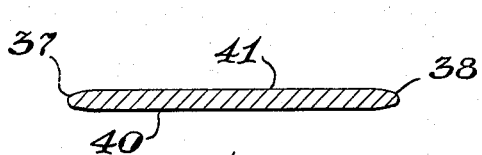
FIGURE 3 is a cross section of the band blade of FIGURE 2 along the line 3—3.

FIGURE 3 illustrates the cross section of the blade 28 taken through the line 3—3.

Figure 4:
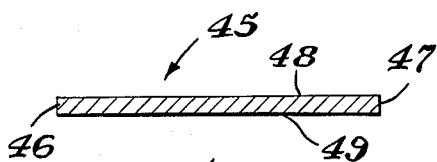
FIGURE 4 is an alternate cross sectional configuration which may be utilized in the practice of the present invention.

FIGURE 4 is a cross section of an alternate configuration of blade designated by the reference numeral 45. The blade 45 has smooth cutting edges 46 and 47, and parallel sides 48 and 49, to provide an elongated rectangular configuration.

The saw of the invention is operated in a manner substantially identical to conventional tooth blades or band knives wherein the work piece if forced against the cutting edge. Advantageously either edge of the band blade may be utilized as the cutting edge. It is critical to the operation of saws of the invention that the blades be made of a metal having a relatively high thermal conductivity, that is, a conductivity greater than about 0.33 calorie per second per centimeter per square centimeter per degree centigrade, whereby the blade edge is forced against the thermoplastic material to be cut at a linear velocity sufficiently high to remove thermoplastic material from the work piece. Suitable metals for the preparation of band blades include aluminum, copper, magnesium, molybdenum, silver, tungsten, as well as alloys having the required thermal conductivity. Often it is particularly convenient and advantageous to utilize copper for the preparation of such blades as it is readily available in sheet form and oftentimes in the form of a flat wire of the desired size, and are readily joined into a suitable band blade by brazing. Generally, for most plastic materials it is desirable to operate the band blade at a cutting speed of at least 30 feet per minute. Although cutting is readily attained at lower speeds the optimum cutting speed will vary with the dimension of the blade, its thermal conductivity, its cross sectional configuration, and the thickness and type of material being cut. However, very satisfactory and acceptable operation is achieved for most purposes at cutting speeds of from about 100 to about 1000 feet per minute utilizing 24 inch thick sheets of polystyrene, polypropylene, saran, ethyl cellulose, and the like. For many applications, it is unnecessary to use an induction heater such as the induction heater 30 of FIGURE 1 to warm the blade prior to entering the work piece. However, if cuts of maximum smoothness and maximum cutting speed are to be obtained, the induction heater is a beneficial asset. The power requirements of the heater vary with the speed of the blade, the feed rate dimensions of the blade, and the like. For example, when employing a $\frac{1}{32}$ inch thick copper band blade $\frac{5}{8}$ of an inch wide and 100 inches long i.e., the total developed length of the blade, to cut polystyrene foam, a blade heater was employed which consisted of a generally annular or toroidal laminated iron core having a cross section of about 2 x 2 inches, a primary winding of about 200 turns of wire to which was applied about 200 volts of 60 cycle alternating current. The band blade formed a short circuited one turn secondary winding substantially as illustrated in FIGURE 1. The resultant blade temperature immediately before entering the foam was 250° Fahrenheit when the blade was traveling at a speed of about 5,000 feet per minute. The warmed blade produced extremely smooth cuts without dust. The same blade without heating produced a smooth dust free cut but the cut surfaces would not have the finished appearance obtained by the warm blade. By way of comparison the copper blade was replaced with a steel blade having identical geometry and, heated or unheated, the steel blade gave a much less satisfactory cut and a slower feed rate than did the copper blade. Utilizing the heated copper blade the material from the kerf was removed in a wire or ribbon-like form and generated no dust whatsoever. Similar beneficial and advantageous results were achieved when smooth toothless blades were employed to cut other thermoplastic materials including nylon, saran, polyvinyl chloride, rigid polyurethanes, ethyl cellulose, polystyrene, polystyrene acrylonitrile copolymer, polyethylene and polypropylene. Particularly smooth and polished surfaces are obtained when blades were employed utilizing the cross sectional configuration of FIGURE 3. The resultant cut surface has an appearance which closely resembles a polished surface and the quality of the surface is primarily dependent upon the precision with which the ends of the band blade are joined. With a careful joint in the blade, excellent smooth surfaces result. For many applications, such smooth surfaces are not necessary and on occasion are undesirable, whereupon the rectangular configuration of blade such as is illustrated in FIGURE 4 is employed.

This configuration is particularly advantageous in that it is readily fabricated from sheet stock of a suitable metal or alloy.

As is apparent from the foregoing specification, the method and apparatus of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. A band saw blade comprising an endless band of generally constant cross section adapted to be mounted on a band saw and having smooth edges of equal length and consisting of metal having a thermal conductivity greater than 0.33 calorie per second per centimeter per square centimeter per degree centigrade.

2. The blade of claim 1 wherein the metal is copper.

3. The blade of claim 1 wherein the band has a rectangular cross section.

4. The blade of claim 1 wherein the blade has parallel sides which taper to a rounded cutting edge.

5. A band saw comprising a first band wheel, a second band wheel, at least one of the band wheels being in cooperative combination with a drive means, a band blade supported and adapted to be driven by the peripheral portion of the band wheels, the band blade comprising an endless metal band having an elongated cross sectional configuration and smooth lineal cutting edges, an induction heater positioned adjacent to and in operative combination with the blade and adapted to heat the blade immediately prior to entering a work piece, the band blade consisting of metal having a thermal conductivity greater than 0.33 calorie per second per centimeter per square centimeter per degree centigrade.

References Cited by the Examiner

UNITED STATES PATENTS

| 2,615,286 | 10/1952 | Descarsin | 83—170 X |
| 2,862,231 | 12/1958 | Voigt | 83—201 X |
| 2,931,263 | 4/1960 | Johnson et al. | 83—170 X |
| 2,972,669 | 2/1961 | Brown | 83—201.8 X |

WILLIAM W. DYER, JR., *Primary Examiner.*

F. T. YOST, *Assistant Examiner.*